Patented Dec. 14, 1937

2,102,115

UNITED STATES PATENT OFFICE 2,102,115

MONOAZODYESTUFFS

Richard Fleischhauer, Frankfort-on-the-Main-Fechenheim, and Erich Fischer, Bad Soden at the Taunus, Germany, assignors to General Aniline Works, Inc., New York, N. Y., a corporation of Delaware No Drawing. Application July 7, 1934, Serial No. 734,202. In Germany, August 22, 1933

5 Claims. (Cl. 260—92)

This invention relates to monoazodyestuffs, more particularly to those corresponding to the general formula

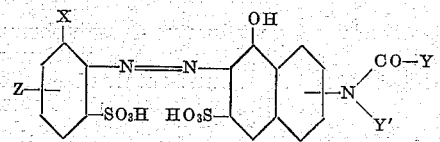

wherein X is selected from the group consisting of hydrogen, methyl, methoxy and phenoxy, Y is selected from the group consisting of $CH_3$, $CH_2OCH_3$ and $C_6H_5$, Y' is selected from the group consisting of hydrogen and alkyl and Z is selected from the group consisting of hydrogen, halogen, methyl and acetylamino.

The present new dyestuffs are obtained by combining the diazocompounds of aromatic amines of the general formula

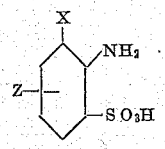

with acylamino-8-naphthol-6-sulfonic acids of the general formula

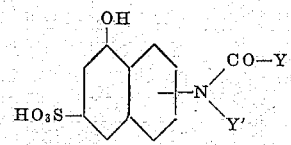

wherein X, Y, Y' and Z have the same meaning as given above.

The present new dyestuffs dye animal fibers bright yellowish orange, yellowish red to scarlet to bluish red shades. They are distinguished, in particular in comparison with known dyestuffs containing one identical component, by good fastness especially to light and good levelling power.

In order to further illustrate our invention the following examples are given, the parts being by weight and all temperatures in centigrade degrees; but we wish it, however, to be understood that our invention is not limited to the particular products nor reacting conditions mentioned therein.

Example 1

17.3 parts of 1-aminobenzene-2-sulfonic acid are diazotized in the usual manner. The diazo solution thus obtained is allowed to flow in while cooling with ice into a solution of 28.5 parts of 1-acetyl-amino-8-naphthol-6-sulfonic acid, to which an excess of sodium bicarbonate has been added. When the combination has been finished the formed new dyestuff is salted out, filtered off and dried. It corresponds to the formula

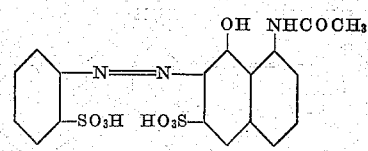

It represents when dry a dark red water soluble powder and dyes wool from an acid bath bright and very even red shades of a good fastness to light, When using instead of the diazo compound of 1-amino-benzene-2-sulfonic acid an equivalent quantity of those of for example 1-amino-2,4,5-trimethylbenzene-6-sulfonic acid, 2-chloro-5-amino-1-methylbenzene-4-sulfonic acid, 5-chloro-2-amino-1-methylbenzene-3-sulfonic acid or 1-amino-4- (or -5-) acylaminobenzene-2-sulfonic acid dyestuffs of similar properties are obtained.

Example 2

20.1 parts of 1-amino-2,4-dimethylbenzene-6-sulfonic acid are diazotized in the usual manner and the diazo-suspension thus obtained is added to a solution of 28.5 parts of 1-acetylamino-8-naphthol-6-sulfonic acid, to which an excess of sodium bicarbonate has been added. The formed dyestuff of the formula

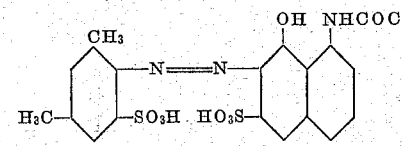

represents when dry a reddish brown water soluble powder and dyes the animal fibers clear and even red shades of a very good fastness to light, Similar dyestuffs are obtained by combining the said diazo component with equivalent amounts of for instance 1-carbethoxy-amino-8-naphthol-6-sulphonic acid, 1-toluene-sulfamino-8-naphthol-6-sulfonic acid, 1-benzoylamino-8-naphthol-6-sulfonic acid or derivatives thereof, in which the hydrogen atom of the acylated aminogroup is substituted by a methyl, phenyl or benzyl group.

Example 3

The diazo compound of 22.1 parts of 1-amino-4-chloro-2-methylbenzene-6-sulfonic acid is combined with a solution of 31,5 parts of 1-methoxy-acetylamino-8-naphthol-6-sulfonic acid, to which an excess of sodium acetate has been added. The formed dyestuff of the formula

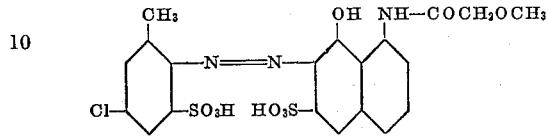

represents a reddish brown water soluble powder and dyes wool even red shades of a very good fastness to light.

Example 4

20.1 parts of 1-amino-2,4-dimethylbenzene-6-sulfonic acid are diazotized in the usual manner. The diazo solution thus obtained is allowed to flow into a cold solution of 29 parts of 2-acetyl-amino-8-naphthol-6-sulfonic acid, to which sodium carbonate or bicarbonate has been added. The formed dyestuff of the formula

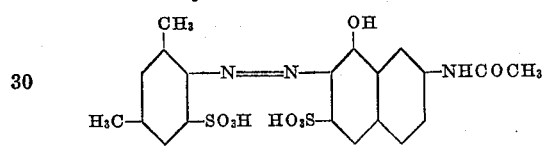

represents when dry an orange easily water soluble powder and dyes wool even yellowish reddish shades of an excellent fastness to light.

A little more yellowish dyestuff is obtained when using the 2-acetylmethylamino-8-naphthol-6-sulfonic acid as combining component.

Still more yellowish dyestuffs are obtained when replacing the said combining components by equivalent quantities of 2-acetylamino-5-naphthol-7-sulfonic acid or 2-acetylmethylamino-5-naphthol-7-sulfonic acid or other derivatives thereof containing instead of the acetyl and methyl radical other acyl, alkyl or aryl radicals.

Example 5

The diazo compound of 17.3 parts of aniline-o-sulfonic acid is combined with a solution of 29 parts of 2-acetylamino-8-naphthol-6-sulfonic acid, to which an excess of sodium bicarbonate has been added. The formed dyestuff of the formula

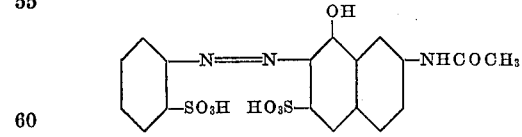

represents when dry a yellowish red water soluble powder and dyes wool very even red shades of an excellent fastness to light.

The isomeric dyestuff of the formula

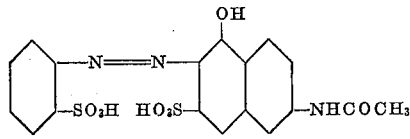

obtained by combining in a like manner the same diazo compound with 2-acetylamino-5-naphthol-7-sulfonic acid, is when dry an orange water soluble powder and dyes wool even yellowish red shades of an excellent fastness to light.

Similar dyestuffs of more reddish shades are obtained when using as diazo components for instance the diazo compounds of 4-amino-1-methyl-benzene-3-sulfonic acid, 4-chloro-aniline-2-sulfonic acid, 5-chloro-2-amino-1-methylbenzene-3-sulfonic acid or 2-chloro-4-amino-1-methylbenzene-5-sulfonic acid, as coupling components for instance the 2-benzoylamino-8-naphthol-6-sulfonic acid or 2-carbalkoxy-amino-8-naphthol-6-sulfonic acids.

Example 6

23 parts of the 1-acetylamino-3-aminobenzene-4-sulfonic acid are diazotized in the usual manner and the diazo solution thus obtained is allowed to flow in while cooling with ice into a solution of 29 parts of 1-acetylamino-5-naphthol-7-sulfonic acid, to which an excess of sodium acetate has been added. The formed dyestuff of the formula

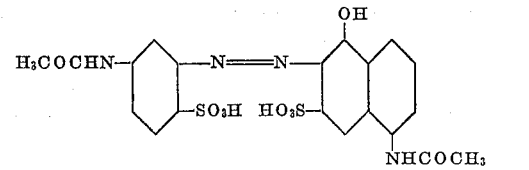

is when dry a yellowish red water soluble powder and dyes wool very even and bright orange-red shades of an excellent fastness to light.

Similar dyestuffs are obtained by using as diazo components analogous compounds, containing instead of the aforesaid acyl radical other acid radicals such as

—CO—CH$_2$—OCH$_3$,—COOC$_2$H$_5$,—COC$_6$H$_5$.

More reddish dyestuffs are obtained by using the diazo compounds of 4-acylamino-1-aminobenzene-2-sulfonic acids as diazo components.

By replacing the 1-acetylamino-5-naphthol-7-sulfonic acid by the corresponding 1-benzoylamino-compound similar dyestuffs are obtained.

When combined with the same diazo compounds acyl derivatives of the 2-amino-5-naphthol-7-sulfonic acid yield yellowish orange dyestuffs and acyl derivatives of the 2-amino-8-naphthol-6-sulfonic acid yield bright red dyestuffs.

In the following table the shades of a series of other dyestuffs corresponding to the general formula are given, but without limiting the scope of the present invention:—

| Formula of the dyestuff | Shade on wool |
| --- | --- |
| 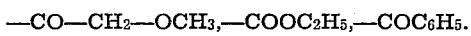 | Bluish red |

| Formula of the dyestuff | Shade on wool |
|---|---|
| 2-phenoxy-4-methyl-5-chloro-aniline → 1-hydroxy-2-acetylamino-naphthalene-type azo dye (OC$_6$H$_5$, H$_3$C-, -SO$_3$H, Cl; coupled to OH, HO$_3$S-, -NHCOCH$_3$) | Red |
| 2,4,6-trimethyl-3-chloro-aniline → 1-hydroxy-2-acetylamino-naphthalene azo dye (CH$_3$, Cl-, H$_3$C-, -SO$_3$H, CH$_3$; coupled to OH, HO$_3$S-, -NHCOCH$_3$) | Yellowish red |
| 2,6-dimethyl-3-chloro-aniline → 1-hydroxy-2-acetylamino-naphthalene azo dye (CH$_3$, Cl-, H$_3$C-, -SO$_3$H, CH$_3$; coupled to OH, HO$_3$S-, -NHCOCH$_3$) | Orange |
| 2,6-dimethyl-5-chloro-aniline → 1-hydroxy-2-acetylamino-naphthalene azo dye (CH$_3$, H$_3$C-, Cl-, -SO$_3$H, CH$_3$; coupled to OH, HO$_3$S-, -NHCOCH$_3$) | Bluish red |
| 2,6-dimethyl-4-chloro-aniline → 1-hydroxy-2-acetylamino-naphthalene azo dye (CH$_3$, H$_3$C-, Cl-, -SO$_3$H, CH$_3$; coupled to OH, HO$_3$S-, -NHCOCH$_3$) | Orange |
| 2-methyl-5-chloro-aniline → 1-hydroxy-2-acetylamino-naphthalene azo dye (H$_3$C-, Cl-, -SO$_3$H; coupled to OH, HO$_3$S-, -NHCOCH$_3$) | Red |
| 2-methyl-4-chloro-aniline → 1-hydroxy-2-acetylamino-naphthalene azo dye (H$_3$C-, Cl-, -SO$_3$H; coupled to OH, HO$_3$S-, -NHCOCH$_3$) | Reddish orange |
| 3-chloro-aniline → 1-hydroxy-2-acetylamino-naphthalene azo dye (Cl-, -SO$_3$H; coupled to OH, HO$_3$S-, -NHCOCH$_3$) | Orange red |
| 4-chloro-aniline → 1-hydroxy-2-acetylamino-naphthalene azo dye (Cl-, -SO$_3$H; coupled to OH, HO$_3$S-, -NHCOCH$_3$) | Orange |
| 2,6-dimethyl-aniline → 1-hydroxy-2-acetylamino-naphthalene azo dye (CH$_3$, H$_3$C-, -SO$_3$H, CH$_2$; coupled to OH, HO$_3$S-, -NHCOCH$_3$) | Orange red |

| Formula of the dyestuff | Shade on wool |
|---|---|
| 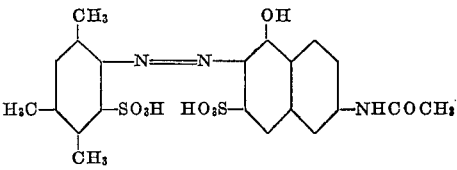 | Orange |
| 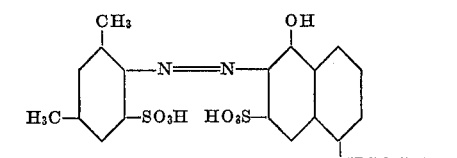 | Reddish orange |
|  | Reddish orange |
| 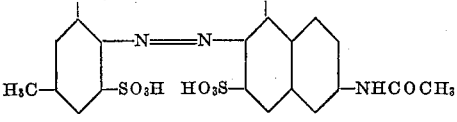 | Orange red |
| 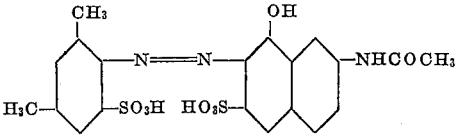 | Orange red |
|  | Orange red |
| 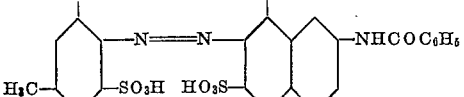 | Red |
| 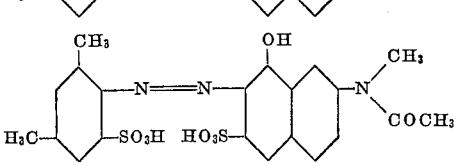 | Reddish orange |
| 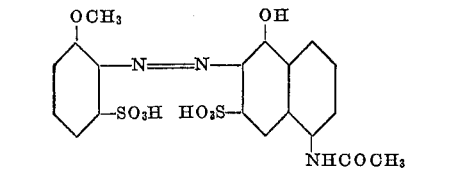 | Orange |
| 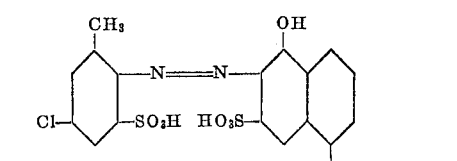 | Reddish orange |
|  | Reddish orange |

| Formula of the dyestuff | Shade on wool |
|---|---|
| 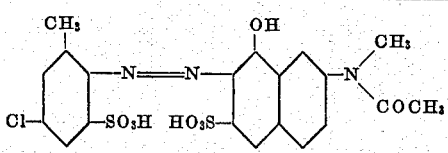 | Reddish orange |

We claim:
1. Monoazodyestuffs corresponding to the general formula

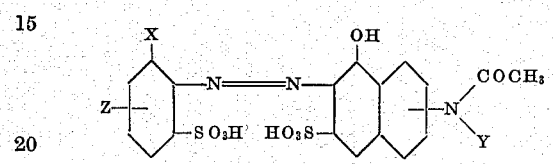

wherein X is selected from the group consisting of hydrogen, methyl, methoxy and phenoxy, Y is selected from the group consisting of hydrogen and alkyl and Z is selected from the group consisting of hydrogen, halogen, methyl and acetylamino, which dyestuffs dye animal fibers bright and even yellowish orange to bluish red shades of a good fastness to light.

2. Monoazodyestuffs corresponding to the general formula:

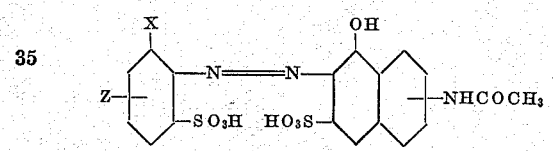

wherein X is selected from the group consisting of hydrogen, methyl, methoxy and phenoxy and Z is selected from the group consisting of hydrogen, halogen, methyl and acetylamino, which dyestuffs dye animal fibers bright and even yellowish orange to bluish red shades of a good fastness to light.

3. The monoazodyestuff of the formula:

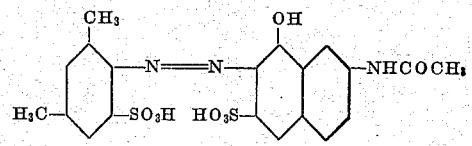

which dyestuff represents when dry an orange water soluble powder and dyes wool even yellowish reddish shades of an excellent fastness to light.

4. The monoazodyestuff of the formula:

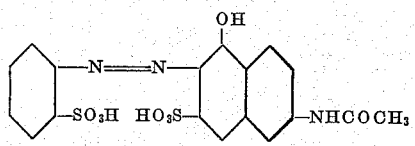

which dyestuff represents when dry an orange water soluble powder and dyes wool even yellowish reddish shades of an excellent fastness to light.

5. The monoazodyestuff of the formula:

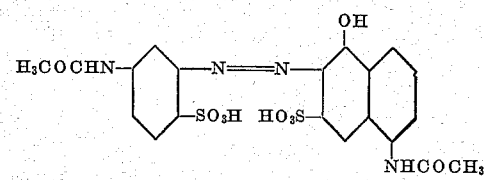

which dyestuff is when dry a yellowish red water soluble powder and dyes wool very even and bright orange-red shades of an excellent fastness to light.

RICHARD FLEISCHHAUER.
ERICH FISCHER.